(12) United States Patent
Bandi et al.

(10) Patent No.: US 12,065,075 B2
(45) Date of Patent: Aug. 20, 2024

(54) SYSTEMS AND METHODS FOR FACILITATING SAFE SCHOOL BUS OPERATIONS

(71) Applicant: Ford Global Technologies, LLC, Dearborn, MI (US)

(72) Inventors: Krishna Bandi, Farmington Hills, MI (US); Nancy Lewis, Ann Arbor, MI (US); Swetha Shailendra, Royal Oak, MI (US); Gibin James, Livonia, MI (US); Sathyanarayana Chary Palakonda, Northville, MI (US); Brandon Klos, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 309 days.

(21) Appl. No.: 17/659,855

(22) Filed: Apr. 20, 2022

(65) Prior Publication Data
US 2023/0339392 A1    Oct. 26, 2023

(51) Int. Cl.
*B60Q 7/02*         (2006.01)
*B60W 40/04*        (2006.01)
(Continued)

(52) U.S. Cl.
CPC ............... *B60Q 7/02* (2013.01); *B60W 40/04* (2013.01); *B60W 50/14* (2013.01); *G06V 20/17* (2022.01);
(Continued)

(58) Field of Classification Search
CPC ......... B60Q 7/02; B60W 40/04; B60W 50/14; B60W 2420/403; G06V 20/17; G06V 20/54; G06V 20/58; H04W 4/44
See application file for complete search history.

(56) References Cited

U.S. PATENT DOCUMENTS 6,223,125 B1    4/2001  Hall
9,718,405 B1    8/2017  Englander et al.
(Continued)

FOREIGN PATENT DOCUMENTS

| CN | 102592395 A | 7/2012 |
| CN | 107272543 A | 10/2017 |
| WO | 2017117790 A1 | 7/2017 |

OTHER PUBLICATIONS

Raja Godwin D et al., Smart School Buss Monitoring System Using IOT, International Journal of Pure and Applied Mathematics, vol. 118, No. 20, 2018, 617-623.

*Primary Examiner* — Mohamed Barakat
(74) *Attorney, Agent, or Firm* — Emily Drake; Eversheds Sutherland (US) LLP

(57) ABSTRACT

Systems and methods for facilitating safe vehicle operations, such as reducing illegal passings, avoiding possible collisions, and assisting road users around a vehicle are provided. The system uses a smart algorithm to perform negotiations between the vehicle, e.g., a school bus, and other road users, e.g., road vehicles, bicycles, scooters, etc. The method may include capturing image data of the surroundings of the school bus to identify violations within a proximity of the school bus such as children jay-walking and vehicles illegally passing the school bus when the stop arm is raised. The captured data may be recorded and shared with the school bus, other road users, or local authorities.

7 Claims, 8 Drawing Sheets

(51) Int. Cl.
  *B60W 50/14* (2020.01)
  *G06V 20/17* (2022.01)
  *G06V 20/54* (2022.01)
  *G06V 20/58* (2022.01)
  *H04W 4/44* (2018.01)

(52) U.S. Cl.
  CPC .............. *G06V 20/54* (2022.01); *G06V 20/58* (2022.01); *H04W 4/44* (2018.02); *B60W 2420/403* (2013.01)

(56) References Cited

U.S. PATENT DOCUMENTS

| | | | |
|---|---|---|---|
| 10,576,945 B2 | 3/2020 | Sung et al. | |
| 2009/0160678 A1* | 6/2009 | Turnbull | B60Q 1/535 340/944 |
| 2009/0195651 A1* | 8/2009 | Leonard | B60R 1/27 348/148 |
| 2014/0306799 A1* | 10/2014 | Ricci | G06V 40/166 340/5.83 |
| 2016/0260326 A1* | 9/2016 | Ng-Thow-Hing | G08G 1/167 |
| 2018/0090005 A1* | 3/2018 | Philosof | G08G 1/164 |
| 2020/0111370 A1* | 4/2020 | Dyer | G08G 1/205 |
| 2020/0160708 A1* | 5/2020 | Kamiya | G06V 20/53 |
| 2020/0361367 A1* | 11/2020 | Hallundb?k | B60Q 1/0035 |
| 2021/0043082 A1* | 2/2021 | Grant | G08G 1/162 |
| 2021/0287546 A1* | 9/2021 | Englander | B60W 40/10 |

\* cited by examiner

SYSTEMS AND METHODS FOR FACILITATING SAFE SCHOOL BUS OPERATIONS

BACKGROUND

It is the nature of school buses to make frequent stops to load and unload students. In many instances, when a school bus stops to drop off or pick up students, motorists must stop as well. However, motorists often fail to stop and will pass the stopped school bus. Thus, there is a need to provide a solution to the current problem of passing stopped school buses, and to provide a preventive measure to ensure that no more children are put in harm's way, such as education of the local laws regarding school buses.

It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
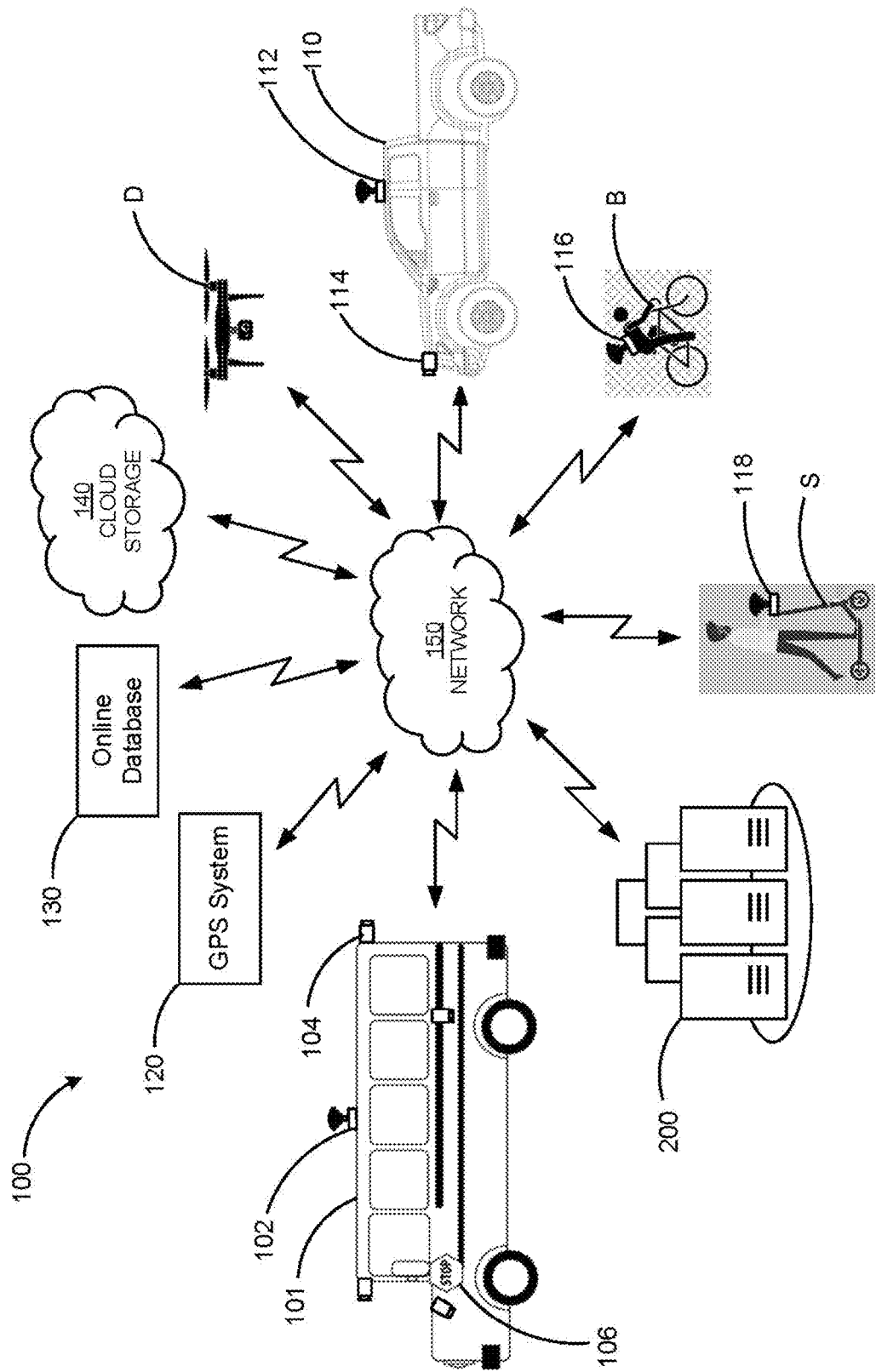
FIG. 1 illustrates a system for facilitating safe vehicle procedures in accordance with the principles of the present disclosure.

Disclosed are system and methods for reducing illegal passing, avoiding possible collisions, and assisting road users around a vehicle, e.g., a school bus, using a smart algorithm. The algorithm performs smart negotiations between a school bus and a road user's vehicle. The method may involve capturing a snap-shot of the surroundings to identify children jay-walking after off-boarding or on-boarding the bus. The method also may involve recording any violations by any road users within a proximity of the school bus. The method also may involve sharing this information with an enforcement authority. The method also may involve assisting the road users by notifying vehicles in advanced based on multiple criteria about the school bus, e.g., an estimated wait time increase, a suggest alternate detour route, and/or a predicted vehicle route by driving behavior learned over time. The method also may involve assisting school bus drivers with safe maneuvers while stopping and starting to ensure children safety all the times. The method also may involve broadcasting the estimated time for on-boarding and off-boarding based on the amount of children present at that stop zone to help road users and parents with pick-up/drop-off timing of the school bus for safety and traffic awareness.

The systems and methods may be applicable in a number of different scenarios. For example, in a first scenario, the algorithm facilitates to maintain minimum distance separation between road vehicles and the school bus at all times while the school bus is in motion, and/or while in a stopped state, and alerts the road vehicle driver accordingly. The algorithm may maintain the minimum distance separation using the road vehicles' sensors and/or using the road vehicle and school bus relative positioning exchanged over a wireless medium.

In a second scenario, a road vehicle may observe children jay-walking after off-boarding and on-boarding a school bus. The algorithm utilizes the road vehicles' sensors to observe the children jay-walking, then performs the following steps. First, the algorithm causes the vehicle to record a snap-shot of the children jay-walking. Second, the algorithm creates a dynamic message of the children's location for awareness around the road users and broadcasts the message over any wireless medium. Third, the algorithm causes the road vehicle to negotiate with the school bus about the snap-shot of the jay-walking children so that school bus may have a record and the school bus driver or associated persons may conduct safety sessions with the respective children for safety awareness. The algorithm also may cause the road vehicle to negotiate with the school bus when other road vehicles fail to stop when the school bus stop-arm is active. Accordingly, the algorithm may cause the road vehicle to generate a snap-shot record of the other vehicle's location, dimensions, license plate, etc. The algorithm may record the violation on an unalterable block chain record by creating a smart contract and further may share the record with an enforcement authority, e.g., via the cloud.

In a third scenario, the smart algorithm may receive real-time information from the cloud and through V2X communications about the school bus. In addition, the algorithm may retrieve information regarding a road vehicle driver's end destination route via navigation and predict the end destination/route from the road vehicle's routine behavior. The algorithm may then alert the road vehicle driver about possible vehicle stops behind the school bus along the road vehicle's navigation route, and may show to the driver alternative detour routes to avoid any delays.

In a fourth scenario, the vehicle smart bus algorithm may perform the following steps for assisting the school bus driver. The algorithm may monitor any safe or unsafe behavior around the school bus surroundings from other road users, e.g., road vehicles, bicycles, pedestrians, etc., via vehicle sensors or wireless medium. If an unsafe behavior threshold met, the algorithm may alert the school bus driver so that the school bus driver does not open the school bus doors or may alternatively drive to a safe place to open the doors. Alternatively, the algorithm may cause a smart school bus to not open its doors without driver intervention.

Examples of unsafe behavior may include road vehicles quickly approaching from the rear, or unusual suspicious activities such as an armed gunman. If a safe behavior threshold met, then the school bus may stop safely and open the doors for children off-boarding. During off-boarding, the school bus may monitor a 360-degree view of its surroundings. If all the children are safely off-boarded, then the school bus driver may be alerted to safely resuming driving. During any unsafe behavior observed, the algorithm may record the snap-shots of the unsafe behavior, and may immediately broadcast the information over the wireless medium.

In a fifth scenario, the vehicle smart bus algorithm may broadcast the estimated time for on-boarding and off-boarding based on the number of children present at that stop zone. The algorithm performs calculation based on historical data. Computed information may be broadcasted by the algorithm when it is about to reach the school bus boarding zone through wireless media. Examples of such information may include dynamic geo-zone coordinates of the stop arm of a school bus being raised and/or an expected duration of how long the stop arm is to be raised in order to make other road users aware of the time estimation for delay avoidance. This estimated time information may be broadcasted over any wireless medium from the smart bus algorithm of the school bus to any road users. This not only helps other road users but also may help parents to approximate pick-up and drop-off timings.

In a sixth scenario, an autonomous road vehicle may be made aware of the information provided by the smart bus algorithm, as described in the scenarios above. In a seventh scenario, a drone may be deployed from the school bus using the vehicle smart bus algorithm for enforcement proof for road user violators, for example, during non-line of sight situations.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination to form additional hybrid implementations of the present disclosure. For example, any of the functionality described with respect to a particular device/component may be performed by another device/component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases are used herein solely for convenience and such words and terms should be interpreted as referring to various objects and actions that are generally understood in various forms and equivalencies by persons of ordinary skill in the art.

Referring now to FIG. 1, an exemplary system for facilitating safe vehicle procedures is provided. As shown in FIG. 1, system 100 may include vehicle 101, e.g., a smart school bus, one or more road users, e.g., road vehicle 110, bicycle B, and/or scooter S, drone D, GPS system 120, and online database 130, all communicatively coupled to vehicular smart bus platform 200 via, e.g., network 150. Vehicular smart bus platform 200 may be located on one or more remote servers, e.g., on a cloud server, and/or embedded in the vehicle control system of vehicle 101.

Vehicle 101 may be a school bus having one or more transmitters/receivers 102 for transmitting and receiving data, e.g., over network 150, one or more sensors 104, e.g., cameras or radar sensors, for capturing image data within a predefined proximity of vehicle 101, and stop arm 106, which may be activated to be raised, e.g., during passenger loading and unloading. Accordingly, sensors 104 may be disposed on vehicle 101 to provide a 360 degree view surrounding vehicle 101.

Road vehicle 110 may be any other vehicle driving on the road, which may approach vehicle 101. Road vehicle 110 may include one or more transmitters/receivers 112 for transmitting and receiving data, e.g., over network 150, and one or more sensors 114, e.g., cameras or radar sensors, for capturing image data within a predefined proximity of road vehicle 110. Sensors 114 may be disposed on road vehicle 110 to provide a 360 degree view surrounding vehicle 110. Preferably, road vehicle 110 has at least one camera positioned at the front of road vehicle 110, to thereby capture image data in front of road vehicle 110.

Vehicle 101 and/or road vehicle 110 may be a manually driven vehicle (e.g., no autonomy) and/or configured and/or programmed to operate in a fully autonomous (e.g., driverless) mode (e.g., Level-5 autonomy) or in one or more partial autonomy modes which may include driver assist technologies. Examples of partial autonomy (or driver assist) modes are widely understood in the art as autonomy Levels 1 through 4. A vehicle having a Level-0 autonomous automation may not include autonomous driving features. An autonomous vehicle (AV) having Level-1 autonomy may include a single automated driver assistance feature, such as steering or acceleration assistance. Adaptive cruise control is one such example of a Level-1 autonomous system that includes aspects of both acceleration and steering. Level-2 autonomy in vehicles may provide partial automation of steering and acceleration functionality, where the automated system(s) are supervised by a human driver that performs non-automated operations such as braking and other controls. In some aspects, with Level-2 autonomous features and greater, a primary user may control the vehicle while the user is inside of the vehicle, or in some example embodiments, from a location remote from the vehicle but within a control zone extending up to several meters from the vehicle while it is in remote operation. Level-3 autonomy in a vehicle can provide conditional automation and control of driving features. For example, Level-3 vehicle autonomy typically includes "environmental detection" capabilities, where the vehicle can make informed decisions independently from a present driver, such as accelerating past a slow-moving vehicle, while the present driver remains ready to retake control of the vehicle if the system is unable to execute the task. Level-4 autonomous vehicles can operate independently from a human driver, but may still include human controls for override operation. Level-4 automation may also enable a self-driving mode to intervene responsive to a predefined conditional trigger, such as a road hazard or a system event. Level-5 autonomy is associated with autonomous vehicle systems that require no human input for operation, and generally do not include human operational driving controls. According to embodiments of the present disclosure, vehicular smart bus platform 200 may be configured and/or programmed to operate with a vehicle having a Level-4 or Level-5 autonomous vehicle controller.

GPS system 120 may be embedded in a GPS navigation software application downloadable on, e.g., a smart mobile phone, such as Google Maps, Waze, Apple Maps, etc., and/or may be embedded within the vehicle control module of vehicle 101 and/or road vehicle 110. Accordingly, GPS system 120 may retrieve and transmit data indicative of a geographical location and/or navigation route associated with vehicle 101 and/or road vehicle 110, in real-time. GPS system 120 may communicate with vehicular smart bus platform 200 to transmit the data indicative of geographical location and/or navigation route associated with vehicle 101 and/or road vehicle 110, as well as receive computed information from vehicular smart bus platform 200 based on the transmitted data, such that GPS system 120 may generate a revised route (re-route) for the planned navigation route of road vehicle 110 to improve navigation efficiency and avoid delays due to potential interactions with vehicle 101 along the planned navigation route of road vehicle 110.

Bicycle B and scooter S may communicate with vehicular smart bus platform 200 over network 150 via a control module having transmitter 116 integrated with bicycle B or a control module having transmitter 118 integrated with scooter S, respectively. Alternatively, bicycle B and scooter S may communicate with vehicular smart bus platform 200 over network 150 via a mobile application running on a mobile device having transmitter 116 associated with the rider of bicycle B or a mobile application running on a mobile device having transmitter 118 associated with the rider of scooter S. Accordingly, the rider may receive computed information from vehicular smart bus platform 200 via their mobile phone whether or not they are riding the bicycle or scooter, e.g., for general safety awareness.

Drone D is a drone that may launch from vehicle 101, and includes one or more cameras for capturing image data surrounding vehicle 101 from an aerial vantage point, and one or more transmitters/receivers for communicating with vehicular smart bus platform 200. Accordingly, drone D may be utilized in non-line of sight situations, e.g., when the sensors of vehicle 101 and/or road vehicle 110 cannot effectively observe a situation surrounding vehicle 101.

Network 150 may include any one, or a combination of networks, such as a local area network (LAN), a wide area network (WAN), a telephone network, a cellular network, a cable network, a wireless network, and/or private/public networks, such as the Internet. For example, the network may support communication technologies, such as TCP/IP, Bluetooth, cellular, near-field communication (NFC), Wi-Fi, Wi-Fi direct, machine-to-machine communication, man-to-machine communication, and/or a vehicle-to-everything (V2X) communication.

Information shared between vehicular smart bus platform 200, smart school bus 101, road vehicle 110, bicycle B, scooter S, drone D, GPS system 120, and online database 130 may be stored on cloud storage 140 and may be bi-directional in nature. For example, in one case, computed information may be transferred from vehicular smart bus platform 200 to cloud storage 140. Such information stored on cloud storage 140 may be accessed and used by various smart vehicles and/or smart mobile devices, e.g., road vehicle 110, bicycle B, and/or scooter S.

Figure 2:
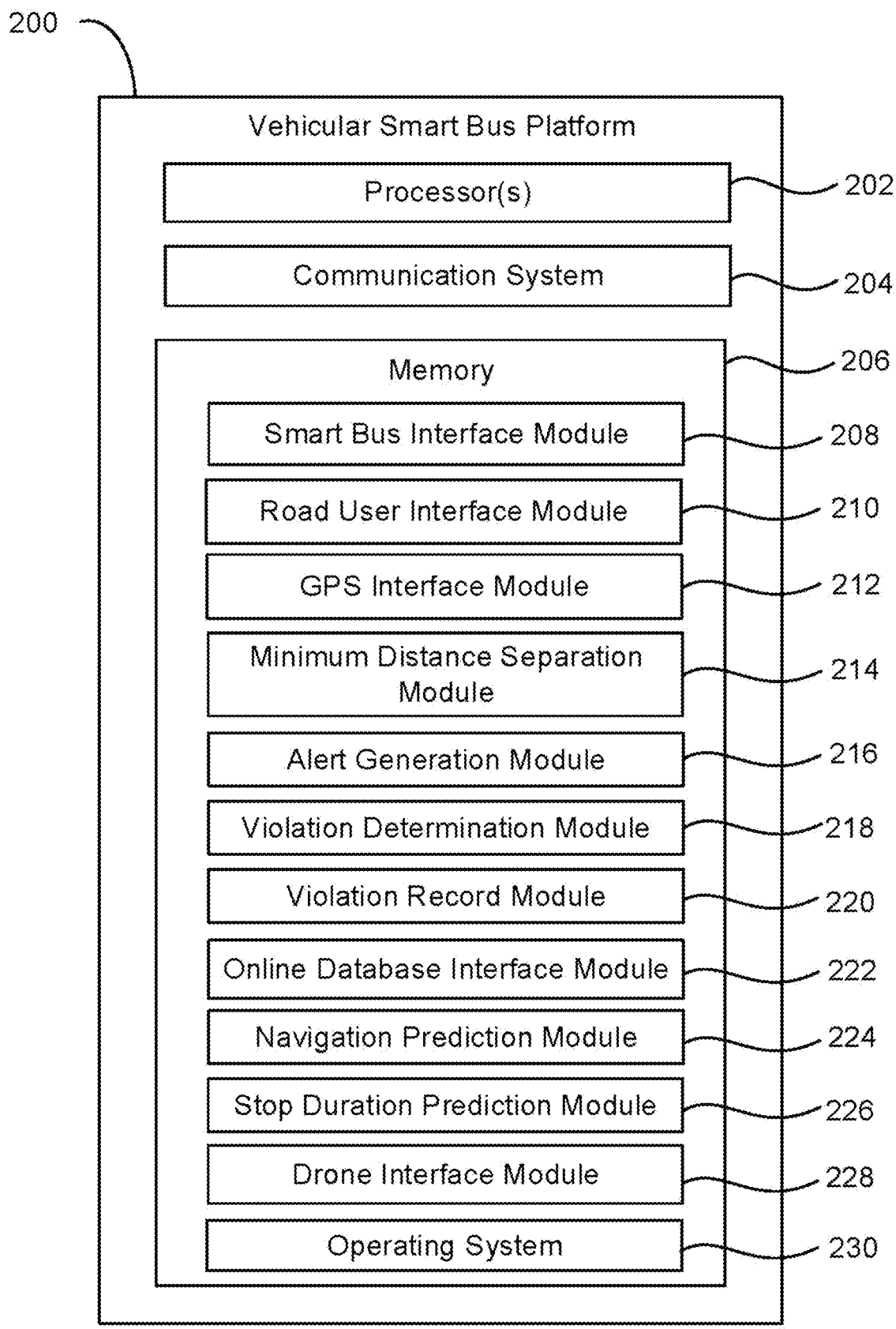
FIG. 2 shows some example components that may be included in a vehicular smart bus platform in accordance with the principles of the present disclosure.

Referring now to FIG. 2, components that may be included in vehicular smart bus platform 200 are described in further detail. Vehicular smart bus platform 200 may include one or more processors 202, communication system 204, and memory 206. Communication system 204 may include a wireless transceiver that allows vehicular smart bus platform 200 to communicate with any one of road vehicle 110, bicycle B, scooter S, drone D, GPS system 120, and online database 130. The wireless transceiver may use any of various communication formats, such as, for example, an Internet communications format, or a cellular communications format.

Memory 206, which is one example of a non-transitory computer-readable medium, may be used to store operating system (OS) 230, smart bus interface module 208, road user interface module 210, GPS interface module 212, minimum distance separation module 214, alert generation module 216, violation determination module 218, violation record module 220, online database interface module 222, navigation prediction module 224, stop duration prediction module 226, and drone interface module 228. The modules are provided in the form of computer-executable instructions that may be executed by processor 202 for performing various operations in accordance with the disclosure.

Memory 206 may include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, memory 206 may incorporate electronic, magnetic, optical, and/or other types of storage media. In the context of this document, a "non-transitory computer-readable medium" can be, for example, but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). The computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Smart bus interface module 208 may be executed by processor 202 for interfacing with the vehicle control module of vehicle 101, e.g., a smart bus, such that smart bus interface module 208 may receive and process data, e.g., image data, captured by sensors 104 of vehicle 101 via transmitter/receiver 102 of vehicle 101. Additionally, smart bus interface module 208 may instruct vehicle 101 to capture image data via sensors 104.

Road user interface module 210 may be executed by processor 202 for interfacing with the vehicle control module of any road user, e.g., road vehicle 110, bicycle B, or scooter S. Alternatively, road user interface module 210 may communicate with the mobile application running on a mobile device associated with the rider of bicycle B and/or scooter S. Accordingly, road user interface module 210 may receive and process data, e.g., image data, captured by sensors 114 of road vehicle 110 via transmitter/receiver 112 of road vehicle 110. Additionally, road user interface module 210 may instruct road vehicle 110 to capture image data via sensors 114.

GPS interface module 212 may be executed by processor 202 for communicating with GPS system 120, to thereby receive data indicative of geographical location and/or navigation route of vehicle 101 and/or vehicle 110. Additionally, GPS interface module 212 may transmit information to GPS system 120, computed based on the received data, as described in further detail below with regard to navigation prediction module 222.

Minimum distance separation module 214 may be executed by processor 202 for determining whether another road user, e.g., road vehicle 110, comes within a predetermined minimum separation distance threshold of vehicle 101, e.g., 10-40 feet, 20-30 feet, 20 feet, etc., based on data indicative of the relative position between vehicle 101 and road vehicle 110. For example, minimum distance separation module 214 may determine the relative distance between vehicle 101 and road vehicle 110 based on data, e.g., image data or radar sensor data, captured by sensors 104 of vehicle 101 and/or sensors 114 of road vehicle 110. Additionally or alternatively, minimum distance separation module 214 may determine the relative distance between vehicle 101 and road vehicle 110 based data indicative of geographical location and/or navigation route of vehicle 101 and/or vehicle 110 received by GPS interface module 212 from GPS system 120. Minimum distance separation module 214 may determine the relative distance between vehicle 101 and road vehicle 110 while vehicle 101 is in motion or in a stopped state.

Alert generation module 216 may be executed by processor 202 for generating an alert for transmission to any one of vehicle 101, road vehicle 110, bicycle B, or scooter S. The alert may include data indicative of a warning to provide situational awareness of a violation to the respective recipient. For example, alert generation module 216 may generate and transmit an alert to road vehicle 110 when minimum distance separation module 214 determines that road vehicle 110 is within the predetermined minimum separation distance of vehicle 101. Additionally, the alert may include information to inform the recipient of additional violations, e.g., children jay-walking, passenger loading/unloading, etc., as described in further detail below.

Violation determination module 218 may be executed by processor 202 for determining whether a violation is occurring or has occurred within a predefined proximity surrounding vehicle 101, based on data received from the sensors of at least one of vehicle 101, road vehicle 110, or drone D. For example, based on the image data received, violation determination module 218 may determine that one or more children are jay-walking adjacent to vehicle 101. Additionally, based on the image data received, violation determination module 218 may determine when another vehicle on the road illegally passes vehicle 101, e.g., a school bus, when the school bus has the stop arm raised. Upon detection of such violations, vehicular smart bus platform 200 may cause any one of vehicle 101, road vehicle 110, and/or drone D to capture/record the violation or to continue capturing/recording the violation, via smart bus interface module 208, road user interface module 210, or drone interface module 228, respectively. Violation determination module 218 further may determine, based on the image data received, additional unsafe conditions such as, for example, an armed gunman within a predefined proximity of vehicle 101.

Violation record module 220 may be executed by processor 202 for recording the data captured indicative of the violation determined by violation determination module 218. For example, violation record module 220 may record image data of the one or more children jay-walking, image data depicting information regarding the illegally passing vehicle, e.g., license plate, make/model of the vehicle, etc., data indicative of the speed of the illegally passing vehicle, image data depicting information regarding a vehicle exceeding the predetermined minimum separation distance of vehicle 101, image data depicting the armed gunman, etc. Violation record module 220 may record the violation on an unalterable block chain record by creating a smart contract, which may be shared with an enforcement authority. The recorded data further may be shared with vehicle 101 for educational purposes, such that the bus driver or associated individuals may educate jay-walking children of their violation for safety awareness.

Online database interface module 222 may be executed by processor 202 for retrieving information from online database 130. For example, the data retrieved may include bus routes associated with a school bus. Further, the data retrieved may include historic data regarding the duration of loading/unloading times for a school bus at any given bus stop.

Navigation prediction module 224 may be executed by processor 202 for predicting potential encounters between road vehicle 110 and vehicle 101, based on, for example, retrieved bus route data via online database interface module 222 from online database 130, and data indicative of geographic location and navigation route of road vehicle 110 via GPS interface module 212 from GPS system 120. For example, based on the planned school bus route of vehicle 101 and the planned navigation route and real-time location of road vehicle 110, navigation prediction module 224 may determine where along the planned navigation route road vehicle 110 is predicted to encounter vehicle 101 while vehicle 101 executes its bus route. Based on the potential encounters, navigation prediction module 224 may generate an alternative route suggestion that may be transmitted to road vehicle 110 for purposes of delay avoidance. Alternatively, GPS interface module 212 may transmit the computer information indicative of the potential encounters to GPS system 120, such that GPS system 120 may generate and suggest alternative routes to road vehicle 110 or the associated driver.

Stop duration prediction module 226 may be executed by processor 202 for predicting loading/unloading times for a given stop of vehicle 101 based on the amount of passengers, e.g., children, in vehicle 101 and waiting at the bus stop outside of vehicle 101. For example, stop duration prediction module 226 may count passengers based on image data captured by interior and/or exterior sensors 104 of vehicle 101, and received via smart bus interface module 208. Moreover, stop duration prediction module 226 may predict loading/unloading times based on retrieved historic data regarding the duration of loading/unloading times for a school bus at any given bus stop from online database 130. The predicting loading/unloading times may be transmitted to other road users, e.g., parents, over network 150 to facilitate navigation planning around pick-up and drop-off times.

Drone interface module 228 may be executed by processor 202 for interfacing with drone D. Drone interface module 228 may cause deployment of drone D from vehicle 101, such that drone D may capture image data from an aerial perspective above vehicle 101 using its onboard sensors, e.g., when the sensors associated with vehicle 101 and/or road vehicle 110 does not have an effective line of sight surrounding vehicle 101. Drone interface module 228 may receive data captured by drone D via transmitters onboard drone D.

Figure 3:
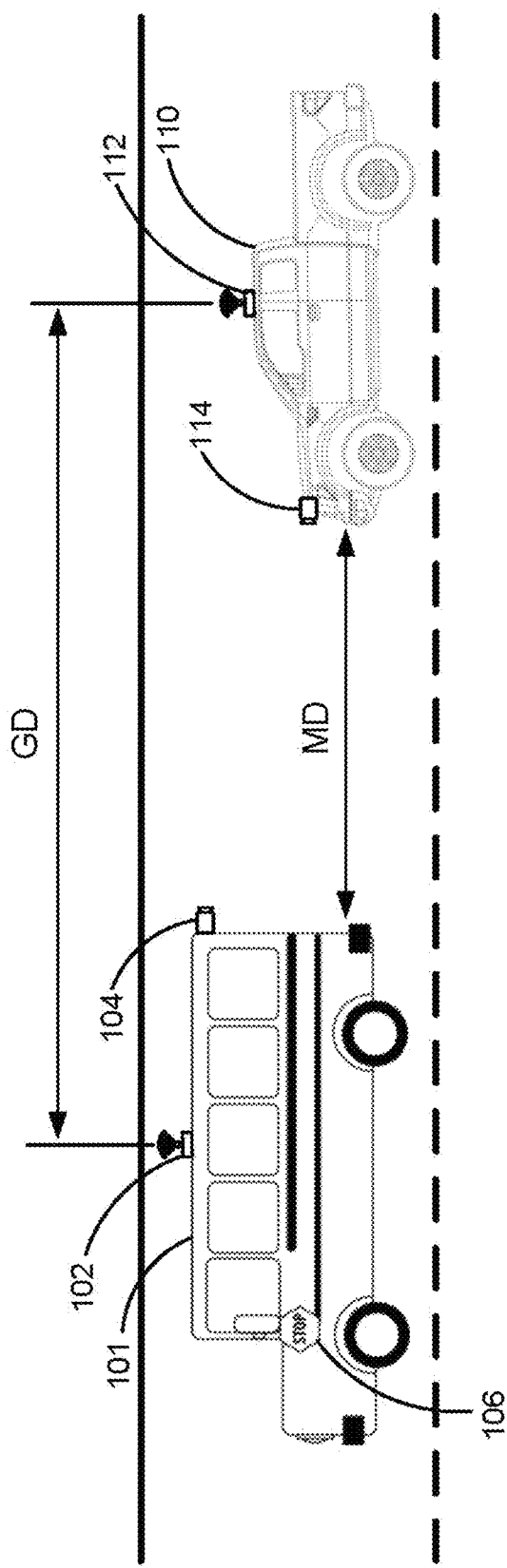
FIG. 3 illustrates implementation of minimum distance separation in accordance with the principles of the present disclosure.

Referring now to FIG. 3, implementation of minimum distance separation is provided. As described above, vehicular smart bus platform 200 can monitor whether a road user, e.g., road vehicle 110, is within predetermined minimum separation distance MD from vehicle 101 based on the relative distance between vehicle 101 and road vehicle 110. For example, the relative distance between vehicle 101 and road vehicle 110 may be determined based on sensors 104 of vehicle 101 and/or sensors 114 of road vehicle 110. Alternatively, relative distance GD between vehicle 101 and road vehicle 110 may be determined based on geographic location data, e.g., vehicle geo-coordinates, of vehicle 101 and road vehicle 110 received from GPS system 120 over network 150 via transmitters 102 of vehicle 101 and transmitters 112 of road vehicle 110. When the relative distance between road vehicle 110 and vehicle 101 is determined to exceed predetermined minimum separation distance MD, an alert may be generated and transmitted to road vehicle 110 so that road vehicle 110 may slow down or otherwise move further away from vehicle 101.

Figure 4:
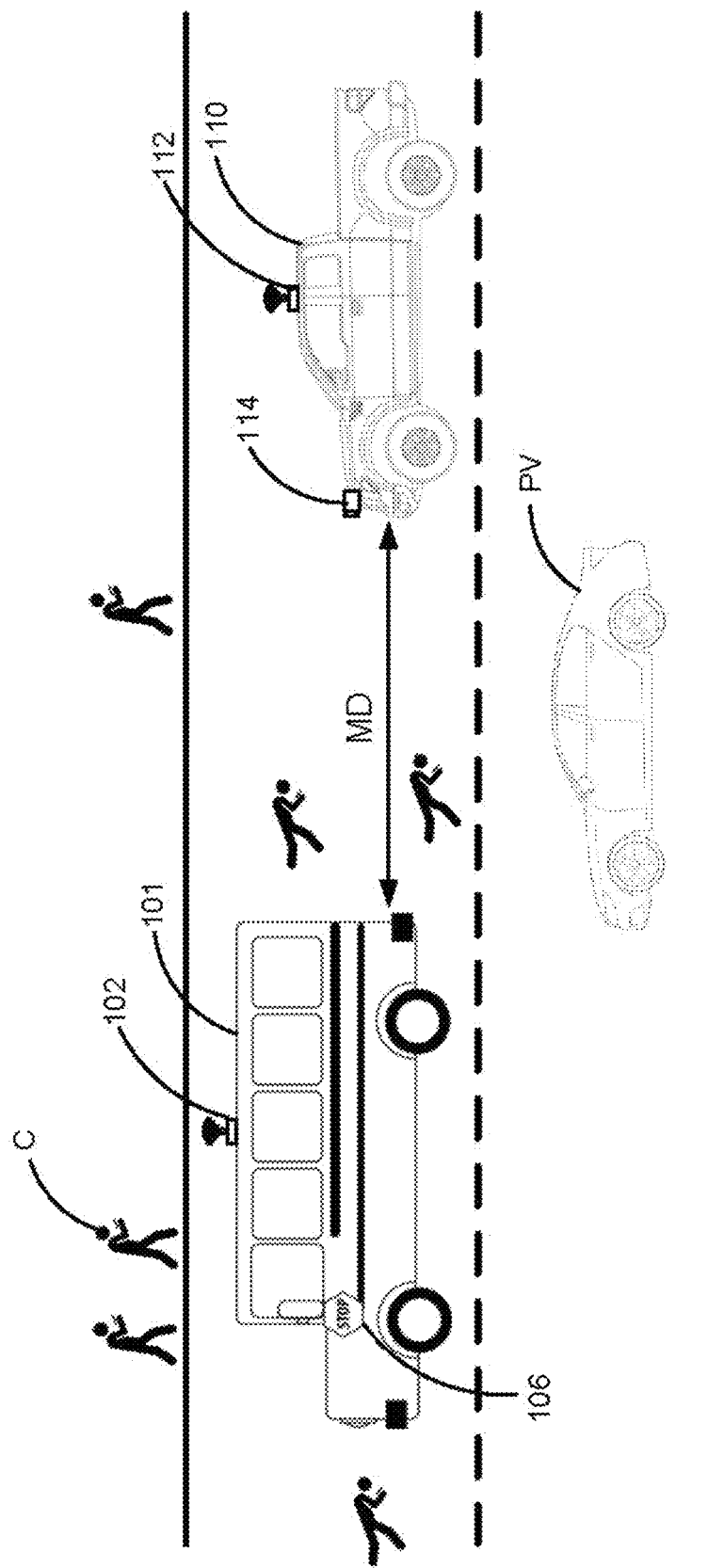
FIG. 4 illustrates implementation of child safety protection in accordance with the principles of the present disclosure.

Referring now to FIG. 4, implementation of child safety protection is provided. As described above, vehicle 101 and/or road vehicle 110 may observe children C jay-walking adjacent to vehicle 101 based image data captures by sensors 104 of vehicle 101 and/or sensors 114 of road vehicle 110. If children C are observed to be jay-walking, image data depicting the children jay-walking may be captured and recorded by vehicular smart bus platform 200, and an alert may be transmitted to nearby road users. Additionally, the recorded image data may be shared with vehicle 101, such that the bus driver and/or other associated individuals may educate the children regarding safety measures. Moreover, vehicle 101 and/or road vehicle 110 may passing vehicle PV that illegally passes vehicle 101, e.g., when stop arm 106 of vehicle 101 is raised during passenger loading and unloading. Accordingly, image data depicting information of passing vehicle PV, e.g., the license plate, the model/make of passing vehicle PV, etc., may be captured and recorded by vehicular smart bus platform 200, e.g., in a block chain record, and shared with local authorities.

Figure 5:
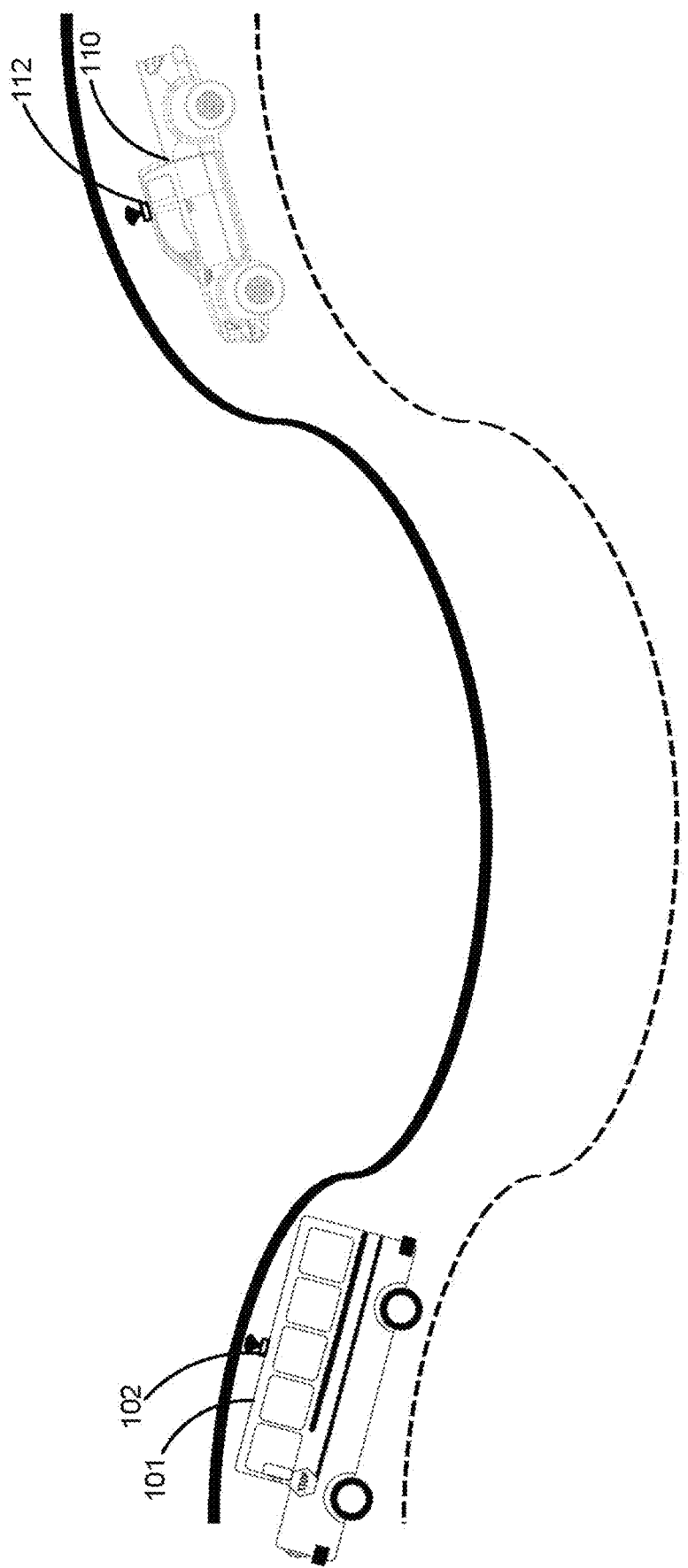
FIG. 5 illustrates implementation of alternative route suggestion in accordance with the principles of the present disclosure.

Referring now to FIG. 5, implementation of alternative route suggestion is provided. As described above, vehicular smart bus platform 200 may predict potential encounters between road vehicle 110 and vehicle 101 based on geographic location and navigation route data of road vehicle 110 received from GPS system 120 via transmitters 112, and geographic location data of vehicle 101 received via transmitters 102 and the bus route of vehicle 101 received from online database 130. Accordingly, vehicular smart bus platform 200 may generate alternative route suggestions, which may be transmitted to road vehicle 110 for alternative navigation route planning to avoid delays along the planned navigation route. Alternatively, vehicular smart bus platform 200 may transmit data indicative of the potential encounters to GPS system 120, such that GPS system 120 may generate suggested alternative routes for road vehicle 110.

Figure 6:
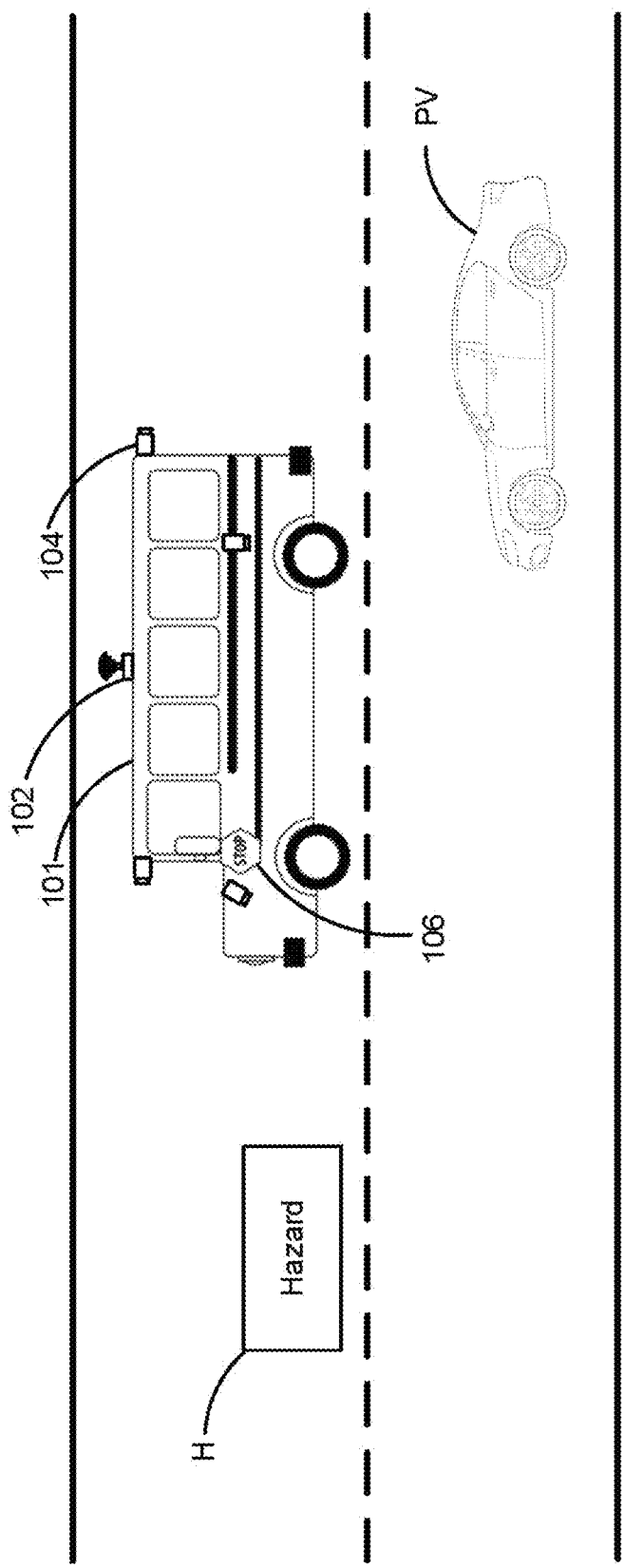
FIG. 6 illustrates implementation of vehicle safety maneuvers in accordance with the principles of the present disclosure.

Referring now to FIG. 6, implementation of vehicle safety maneuvers is provided. As described, vehicle 101 may use its own onboard sensors 104, e.g., cameras and/or radar sensors, to detect a violation such as hazard H, e.g., jay-walking children or an armed gunman, or passing vehicle PV that illegally passes vehicle 101 when stop arm 106 is raised. Vehicle 101 may capture image data depicting the violation to share with local authorities or for educational purposes, as described above. Onboard sensors 104 may be positioned on or within vehicle 101 in a manner so as to provide a 360 degree view around vehicle 101 to provide complete situational awareness around vehicle 101, as well as the implications such as children safety and bus driver decisions.

Figure 7:
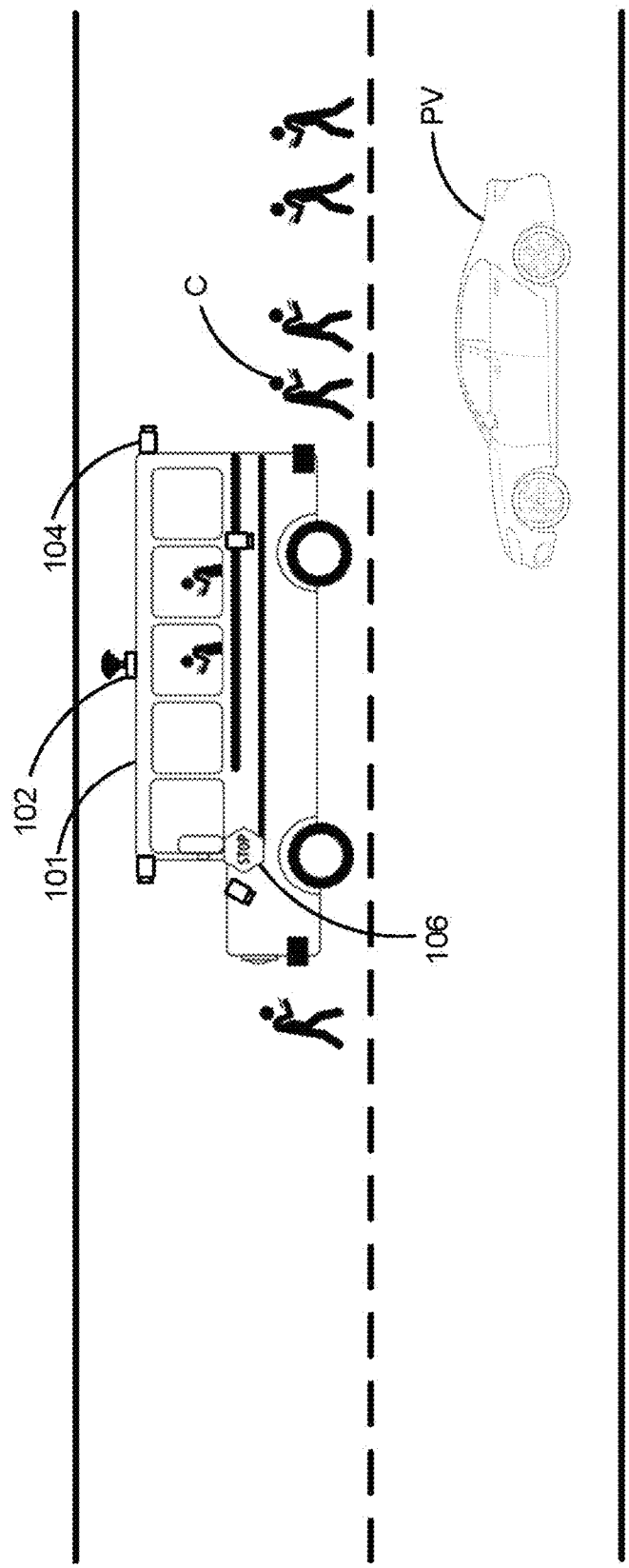
FIG. 7 illustrates implementation of on-boarding and off-boarding time estimation in accordance with the principles of the present disclosure.

Referring now to FIG. 7, implementation of on-boarding and off-boarding time estimation is provided. As described above, vehicular smart bus platform 200 may predict passenger loading/unloading times based on data indicative of the number of children C in vehicle 101 and waiting at a bus stop captured by sensors 104, and on historic data retrieved from online database 130. The predicted passenger loading/unloading times may be shared with other road users, e.g., parents, for planning children pick-up and drop-off times.

Figure 8:
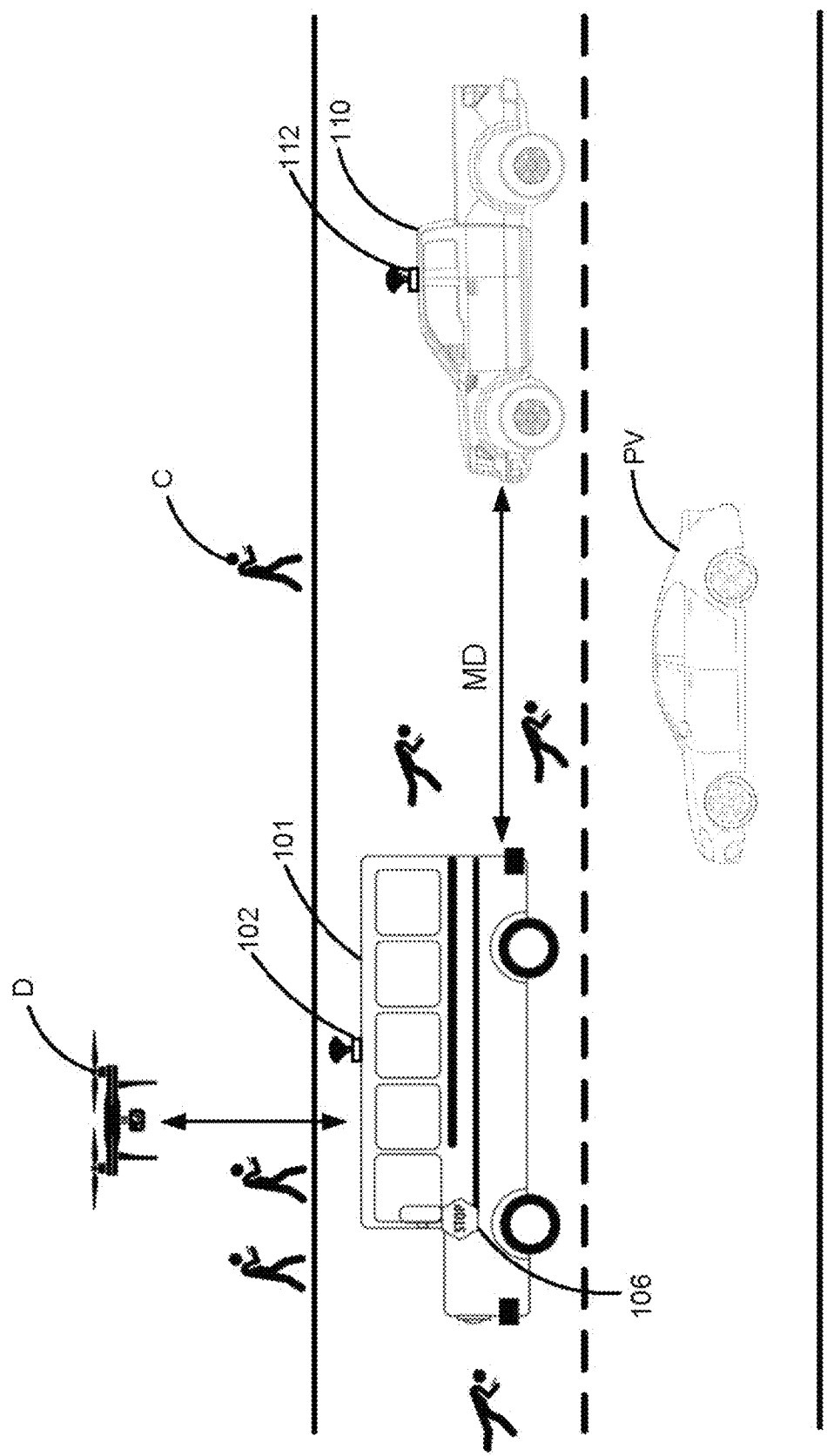
FIG. 8 illustrates implementation of drone deployment in accordance with the principles of the present disclosure.

Referring now to FIG. 8, implementation of drone deployment is provided. As described above, drone D may be deployed in situations where sensors 104 of vehicle 101 and sensors 114 of road vehicle 110 do not have an effective line of sight of the surroundings of vehicle 101, and thus are incapable of identifying a hazardous situation around vehicle 101. Drone D may capture image data indicative of violations occurring around vehicle 101 from an aerial perspective via onboard cameras, and may share the data with vehicular smart bus platform 200, such that vehicular smart bus platform 200 may create a record of the violation, generate corresponding alerts, and/or share with local authorities. For example, Drone D may capture, record, and transmit image data depicting information of an illegally passing vehicle, e.g., the license plate, the model/make of illegally passing vehicle PV, etc.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions, such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, and/or wireless data links) through a network, both perform tasks. In a distributed system environment, program modules may be located in both the local and remote memory storage devices.

Further, where appropriate, the functions described herein may be performed in one or more of hardware, software, firmware, digital components, or analog components. For example, one or more application specific integrated circuits (ASICs) may be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed:

1. A system comprising:
a memory that stores computer-executable instructions; and
a processor configured to access the memory and execute the computer-executable instructions to:
receive data from one or more sensors indicative of a hazard adjacent to a vehicle;
identify the hazard based on the data received from the one or more sensors;
generate an alert indicative of the identified hazard; and
transmit the alert to a road user within a predetermined distance from the vehicle,
wherein the hazard comprises a person jay-walking adjacent to the vehicle, and wherein the alert comprises a dynamic message of the person's location, and
wherein the data received from the one or more sensors comprises image data received from one or more cameras disposed on a road vehicle adjacent to the vehicle, the image data indicative of the person jay-walking adjacent to the vehicle, and wherein the processor is further configured to:
store the image data indicative of the person jay-walking adjacent to the vehicle; and
transmit the image data to the vehicle to facilitate safety sessions with the person for safety awareness.

2. The system of claim 1, wherein the vehicle is a school bus.

3. The system of claim 1, wherein the hazard comprises the road user exceeding a predetermined minimum separation distance between the road user and the vehicle.

4. The system of claim 3, wherein the data received from the one or more sensors comprises image data received from one or more cameras disposed on at least one of the vehicle or the road user, the image data indicative of relative distance between the vehicle and the road user.

5. The system of claim 3, wherein the data received from the one or more sensors comprises location data of the vehicle and the road user received from a GPS system of the vehicle and the road user, respectively, the location data indicative of relative distance between the vehicle and the road user.

6. The system of claim 3, wherein the hazard comprises the road user exceeding a minimum separation distance between the road user and the vehicle while the vehicle is moving, while the vehicle is stationary, or while a stop arm of the vehicle is raised.

7. The system of claim 1, wherein the alert is transmitted to the road user via a cloud database.

* * * * *